June 30, 1925.
J. B. MINER
MUZZLE
Filed Feb. 27, 1925
1,543,784
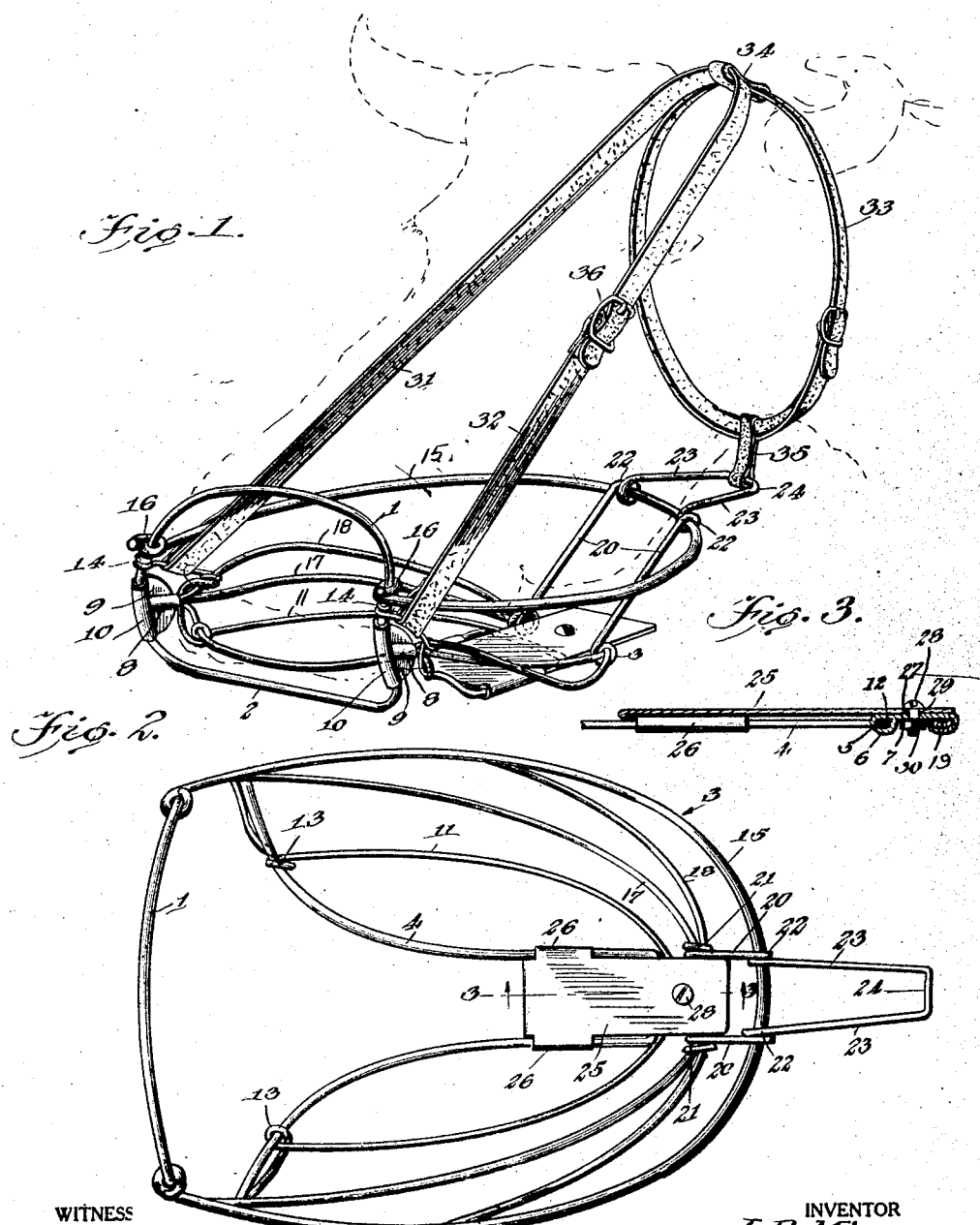
WITNESS
INVENTOR
J. B. Miner.
BY
ATTORNEYS Patented June 30, 1925.

1,543,784

UNITED STATES PATENT OFFICE.

JAMES B. MINER, OF BEND, OREGON.

MUZZLE.

Application filed February 27, 1925. Serial No. 12,064.

*To all whom it may concern:*

Be it known that I, JAMES B. MINER, a citizen of the United States, and a resident of Bend, in the county of Deschutes and State of Oregon, have invented certain new and useful Improvements in Muzzles, of which the following is a specification.

My invention relates generally to improvements in muzzles, and more particularly to muzzles for cattle and like live stock, and it consists in the combinations, constructions and arrangements herein described and claimed.

An object of the invention is to provide a muzzle which will prevent an animal to which the muzzle is applied from eating too ravenously and to excess of vegetation which would be likely to cause bloating of the animal.

A further object of the invention is to provide a muzzle of the character described which will afford facilities for limiting the grazing activities of an animal to which a muzzle is applied so that the animal is prevented from eating too ravenously or an excessive quantity of alfalfa or like vegetable matter without any injury to or soreness of the jaws, tongue or nose of the animal resulting from the functioning of the device.

Other objects and advantages will be apparent from the following description, considered in conjunction with the accompanying drawings, in which Figure 1 is a perspective view showing the muzzle in applied position on the head of a cow, the latter being shown in dotted lines, Figure 2 is a plan view of the muzzle with the attaching straps thereof omitted, Figure 3 is a section along the line 3—3 of Figure 2.

As is well known, domestic animals, and particularly cattle are likely to eat alfalfa and like vegetation so ravenously, if unrestrained, that bloating and death of such animals are likely to follow. It therefore is important that an animal having access to alfalfa or the like will be prevented from eating a quantity of the vegetation sufficient to cause any illness. The present invention provides a device for limiting the relative movement of the jaws of an animal to which the device is applied so that the animal is permitted to eat vegetation in sufficient quantity during a given period to constitute a desirable ration for the animal without permitting over indulgence or extremely rapid consumption of alfalfa or like vegetation. The device is easily and quickly applied to the head of an animal, permits a desirable grazing activity of the animal without causing any chafing or soreness of the nose, jaws or tongue of the animal, and does not cause any annoyance or discomfort to the animal.

The muzzle embodying the invention comprises a nose loop 1 which is flattened at its lower side as indicated at 2 and is of sufficient area to receive the extreme end portion of the muzzle of a cow or like animal. The nose piece 1 is carried at the forward end of a jaw guard which is shown as being a substantially shovel-shaped wire frame indicated generally at 3. The bottom of the wire frame 3 includes a substantially U-shaped wire member 4 having the bight portion thereof, indicated at 5, extended through a transverse eye 6 at the forward end of a plate 7 while the arms of the member 4 curve outwardly and apart near their extremities and are secured at their extremities in sockets 8 of attaching plates 9 which have sleeve portions 10 secured on the side portions of the nose loop 1 adjacent to their juncture with the ends of the lower portion 2 of the latter. The bottom of the frame 3 also includes a substantially U-shaped wire member 11 which has the arms thereof disposed outwardly of the intermediate portions of the member 4. The bend portion of the U-shaped member 11 extends through the eye 6. The arms of the member 11 are twisted around the laterally curved end portions of the arms of the U-shaped members 4 at 13, and the extreme end portions of the member 11 are bent upwardly and are attached at 14 to the side portions of the nose loop 1 at points above the level of the ends of the sleeve portions 10 of the attaching plate 9. The member 11 therefore not only supplements the member 4 to add to the width of the bottom of the frame 3 but stays the arms of the members 4 to the plate 7 and to the nose loop 1. The frame 3 also includes an upper guard member 15 which is substantially U-shaped and has the arms thereof attached as at 16 to the side portions of the nose loop 1 at a level which is slightly above that of the transverse median line of the nose loop 1. The respective arms of the upper guard member 15 are located above and laterally of the corresponding arms of the member 11 and the bend portion of the member 15 is located above and rearwardly of the bend portion of the member 11. Intermediate U-shaped guard members 17 and 18 respectively have the bend portions thereof extended through a transverse eye 19 at the rearward end of the plate 7, while the arms of the members 17—18 are secured at their extremities in the sockets 8 of the attaching plate 9 as best seen in Figure 1, the arms of the member 18 extending laterally outward and at a higher level than the corresponding arms of the member 17. The upper member 15 has the bend portion thereof stayed to the bottom of the frame 3 by wire members 20 which have the lower end portions thereof twisted around the arms of the members 17 and 18 at opposite ends of the eye 19 as indicated at 21 while the upper ends of the wire members 20 are bent around the bend portion of the member 15 at 22, and then are extended rearwardly as the arms 23 of a substantially U-shaped attaching member 24. A lower jaw rest plate 25 is provided adjacent to its forward end with a pair of parallel laterally offset sleeve portions 26 through which the intermediate portions of the arms of the member 4 slidably extend. The rearward end portion of the rest plate 25 overlaps the plate 7 and is provided with a vertical opening 27. A bolt 28 may be projected through the opening 27 into an alined opening 29 in the plate 7 and the plate 25 thus may be secured to the plate 7. A nut 30 is of course screwed on the shank of the bolt 28 to prevent accidental displacement of the bolt 28 and to hold the rearward end portion of the plate 25 against upward movement from the plate 7.

The device is supported on the head of a cow or like animal by means of a pair of side straps 31—32 respectively, a throat latch strap 33, a strap loop 34 which connects the upper portion of the throat latch strap 33 with the strap 31 at the top of the head of the animal, and a second strap loop 35 which connects the lower portion of the throat latch strap 33 with the lower portion of the attaching member 24. The side strap 31 is shown as being of greater length than the side strap 32 and is extended through the strap loop 34 and then downwardly for engagement with a buckle 36 or like fastening element on the upper end of the side strap 32.

From the foregoing description of the various parts of the device, the operation thereof may be readily understood. When the animal equipped with the device lowers its head to graze, the substantially straight portion 2 of the nose loop will contact with the ground. The animal is permitted to open its jaws wide enough to admit a moderate quantity of vegetation through the space between the arms of the member 4 and through the spaces between adjacent arms of the members 4 and 11 into its mouth, but the engagement of the guard 3 with the lower jaw of the animal and the engagement of the upper portion of the nose loop 1 with the upper side of the muzzle of the animal prevents the animal from opening its mouth wide enough to take in more than a moderate quantity of vegetation. The animal therefore is not permitted to obtain enough vegetation to cause it to become bloated or to suffer any ill effects.

Obviously, the invention is susceptible of embodiment in forms other than that which is illustrated in the accompanying drawings, and I consider as my own all such modifications and adaptations thereof as fairly fall within the scope of the appended claims.

I claim:—

1. A muzzle for live stock comprising a nose loop, a substantially shovel-shaped lower jaw guard made of spaced apart wire members and attached at it forward end to side portions of said nose loop, a pair of side straps connected at their lower ends to the bottom portion of said guard adjacent to the juncture of the latter with side portions of the nose loop, said side straps being adapted to be adjustably engaged with each other at their other ends and to extend at the sides of the head of a grazing animal and across the head of a grazing animal, a strap encircling the throat of the animal, means connecting the side straps with the upper portion of the throat strap, and other means connecting the lower portion of the throat strap with the rearward portion of the guard.

2. A muzzle for live stock comprising a nose loop, a substantially shovel shaped lower jaw guard made of spaced apart wire members and attached at its forward end to side portions of said nose loop, an attaching member extending rearwardly from the upper part of the rearward portion of said shovel-shaped lower jaw guard, and means for suspending said nose loop and guard as a unit from the head of a grazing animal.

3. A muzzle for live stock comprising a nose loop, a substantially shovel shaped lower jaw guard made of spaced apart wire members and attached at its forward end to side portions of said nose loop, a substantially U-shaped attaching member having the arms thereof secured to the rearward portions of said shovel-shaped lower jaw guard and extending rearwardly from said guard, and means connected with said attaching member and with the opposite side portions of said shovel-shaped guard adjacent to the juncture of said guard with said nose loop for suspending said nose loop and guard as a unit from the head of a grazing animal.

JAMES B. MINER.